United States Patent
Collins et al.

(10) Patent No.: US 11,308,126 B2
(45) Date of Patent: *Apr. 19, 2022

(54) DIFFERENT HIERARCHIES OF RESOURCE DATA OBJECTS FOR MANAGING SYSTEM RESOURCES

(71) Applicant: Amazon Technologies, Inc., Seattle, WA (US)

(72) Inventors: Brian Collins, Seattle, WA (US); Zachary Mohamed Shalla, Seattle, WA (US); Marvin Michael Theimer, Seattle, WA (US); John Petry, Seattle, WA (US); Michael Hart, Seattle, WA (US); Serge Hairanian, Newcastle, WA (US); Anders Samuelsson, Redmond, WA (US); Salvador Salazar Sepulveda, Seattle, WA (US); Ji Luo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/692,073

(22) Filed: Nov. 22, 2019

(65) Prior Publication Data

US 2020/0097489 A1 Mar. 26, 2020

Related U.S. Application Data

(63) Continuation of application No. 15/276,708, filed on Sep. 26, 2016, now Pat. No. 10,489,424.

(51) Int. Cl.
*G06F 16/00* (2019.01)
*G06F 16/28* (2019.01)
(Continued)

(52) U.S. Cl.
CPC .......... *G06F 16/282* (2019.01); *G06F 9/5061* (2013.01); *G06F 16/2365* (2019.01); *G06F 9/546* (2013.01)

(58) Field of Classification Search
CPC .. G06F 16/282; G06F 16/2365; G06F 9/5061; G06F 9/546
See application file for complete search history.

(56) References Cited

U.S. PATENT DOCUMENTS 5,737,559 A 4/1998 Orton et al.
5,940,839 A 8/1999 Chen et al.
(Continued)

FOREIGN PATENT DOCUMENTS

WO 2012068488 5/2012

OTHER PUBLICATIONS

Markus Vilcinskas, "What is Azure Active Directory?", Retrieved from URL: https://azure.microsoft.com/en-us/documentation/articles/active-directory-whatis/, Published on Aug. 23, 2016, pp. 1-4.

(Continued)

*Primary Examiner* — Alexander Khong
(74) *Attorney, Agent, or Firm* — Robert C. Kowert; Kowert, Hood, Munyon, Rankin & Goetzel, P.C.

(57) ABSTRACT

Resource data objects describing resources in a system may be maintained in multiple different hierarchies for applying policies to manage the resources. Lookup requests may access the different hierarchies to determine which policies are applicable to a given resource based on the policies identified in each of the hierarchies. Modifications to hierarchies may be performed in isolation so that the application of policies in other hierarchies is unchanged by modifications to a different hierarchy. Access restrictions may be (Continued)

enforced with respect to hierarchies so that different users may be permitted access to different hierarchies for system resource management.

20 Claims, 11 Drawing Sheets

(51) Int. Cl.
*G06F 9/50* (2006.01)
*G06F 16/23* (2019.01)
*G06F 9/54* (2006.01)

(56) References Cited

U.S. PATENT DOCUMENTS

| | | |
|---|---|---|
| 6,272,488 B1 | 8/2001 | Chang et al. |
| 6,311,192 B1 | 10/2001 | Rosenthal et al. |
| 6,421,658 B1 | 7/2002 | Carey et al. |
| 6,510,420 B1 | 1/2003 | Cessna et al. |
| 6,523,032 B1 | 2/2003 | Sunkara et al. |
| 6,625,602 B1 | 9/2003 | Meredith et al. |
| 6,826,570 B1 | 11/2004 | Eshel et al. |
| 6,832,202 B1 | 12/2004 | Schuyler et al. |
| 6,947,951 B1 | 9/2005 | Gill |
| 6,957,230 B2 | 10/2005 | Cameron et al. |
| 6,996,601 B1 | 2/2006 | Smith |
| 7,131,071 B2 | 10/2006 | Gune et al. |
| 7,136,867 B1 | 11/2006 | Chatterjee et al. |
| 7,159,125 B2 | 1/2007 | Beadles et al. |
| 7,231,384 B2 | 6/2007 | Wu et al. |
| 7,246,128 B2 | 7/2007 | Jordahl |
| 7,305,419 B1 * | 12/2007 | Cosby .................... G06Q 10/10 |
| 7,379,931 B2 | 5/2008 | Morinville |
| 7,383,285 B1 | 6/2008 | Pal et al. |
| 7,620,647 B2 * | 11/2009 | Stephens ................ G06Q 10/06 |
| 8,275,836 B2 | 9/2012 | Beaven et al. |
| 8,429,197 B1 | 4/2013 | Desai et al. |
| 8,863,299 B2 | 10/2014 | Sharma et al. |
| 8,880,654 B2 | 11/2014 | Zachos |
| 10,454,786 B2 | 10/2019 | Collins et al. |
| 10,489,424 B2 | 11/2019 | Collins et al. |
| 10,545,950 B2 | 1/2020 | Collins et al. |
| 2004/0064527 A1 | 4/2004 | Brunet et al. |
| 2004/0225988 A1 | 11/2004 | Petunin et al. |
| 2007/0158684 A1 | 7/2007 | Kohiro et al. |
| 2009/0132557 A1 | 5/2009 | Cohen et al. |
| 2009/0241104 A1 | 9/2009 | Amiga et al. |
| 2010/0023520 A1 | 1/2010 | Barboy et al. |
| 2010/0088334 A1 | 4/2010 | Wasserman et al. |
| 2012/0084325 A1 | 4/2012 | Bansode et al. |
| 2012/0150912 A1 | 6/2012 | Ripberger |
| 2012/0311672 A1 | 12/2012 | Connor et al. |
| 2013/0036102 A1 | 2/2013 | Goyal et al. |
| 2013/0227637 A1 | 8/2013 | Nagarajan et al. |
| 2014/0237550 A1 | 8/2014 | Anderson et al. |
| 2014/0280961 A1 | 9/2014 | Martinez et al. |
| 2016/0112497 A1 | 4/2016 | Koushik et al. |
| 2016/0269373 A1 | 9/2016 | White et al. |
| 2016/0283540 A1 | 9/2016 | Barber et al. |
| 2017/0123663 A1 | 5/2017 | Panasko et al. |
| 2018/0089250 A1 | 3/2018 | Collins et al. |
| 2018/0091583 A1 | 3/2018 | Collins et al. |

OTHER PUBLICATIONS

International Search Report and the Written Opinion from PCT/US2017/052943, dated Dec. 14, 2017, pp. 1-6.
Symantec Corporation, "E-security begins with sound security policies", Announcement Symantec, Dated Jun. 14, 2001, pp. 1-23.
U.S. Appl. No. 15/275,219, filed Sep. 23, 2016, Brian Collins et al.
U.S. Appl. No. 16/751,727, filed Jan. 24, 2020, Brian Collins et al.

* cited by examiner

DIFFERENT HIERARCHIES OF RESOURCE DATA OBJECTS FOR MANAGING SYSTEM RESOURCES

This application is a continuation of U.S. patent application Ser. No. 15/276,708, filed Sep. 26, 2016, which is hereby incorporated by reference herein in its entirety.

BACKGROUND

Large systems with many users often require complex management schemes in order to ensure that both users and system components are appropriately utilized for performing operations. Instead of reconfiguring or redesigning system components each time changes in the appropriate actions or behaviors taken by system components on behalf of users are to be implemented, resource management systems have been developed to allow for the separate management of actions and behaviors that may be performed by system components. Access privileges, for instance, may be defined for one or multiple users with respect to certain system components in a resource management system so that when access requests from the users directed to the certain system components are received, the resource management system may indicate to the system components which requests may or not be performed based on the defined access privileges. In this way, resource management systems reduce the costs associated with modify or enforcing actions or behaviors of system components by reducing the number of changes that have to be implemented directly at system components. However, as the size of systems continues to increase, the ability of resource management systems to cope with growing numbers of system components in order to define and apply appropriate actions or behaviors for the system components may become less efficient without further capabilities to optimally manage system components.

Figure 1:
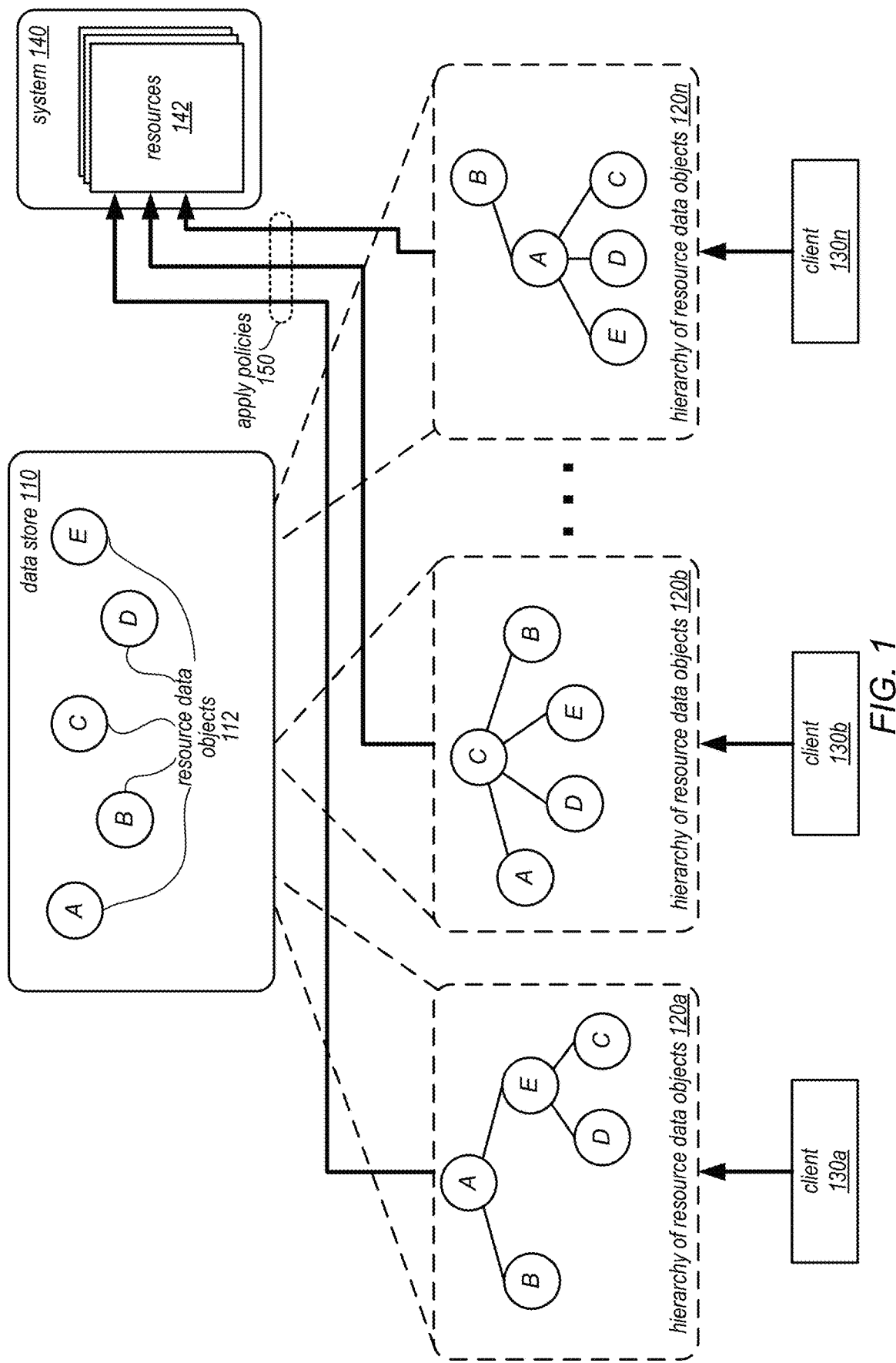
FIG. 1 is a logical block diagram illustrating different hierarchies of resource data objects for managing system resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of different hierarchies of resource data objects for managing system resources are described herein. Managing system resources often involves defining and enforcing the permitted actions, configurations, controls or any other definition of behaviors for the system resources. For example, security policies, such as access rights or permitted actions for system resources, may be defined and enforced for users of the system resources. In various embodiments, data describing the resources of a system may be maintained that also describes these permitted behaviors. For example, data objects describing system resources may be maintained to identify policies that indicate the permitted behaviors for the system resources. In order to apply the same policies to multiple resource data objects, a hierarchy or structure of the resource data objects may be implemented. For example, a tree structure may be implemented that arranges the resource data objects in groups, directories, or other sets of resource data objects which apply those policies inherited along the path of the tree structure from the resource data object to the root of the tree structure. In this way, policies applied to parent nodes (e.g., the groups, directories, or other set of resource data objects) may be inherited and applied to child nodes (e.g., the resource data objects in the groups, directories, or sets).

Applying policies to a single structure of resource data objects, however, limits that effectiveness of the single structure to apply policies to resource data objects that could be grouped differently than the groups, directories, or sets defined by the single structure. For example, a structure of resource data objects that arranges the resource data objects into groups based on resource type (e.g., servers, network routers, storage devices, user accounts, etc.) may provide an optimal structure for applying policies common to one resource type, but make it difficult to apply policies to the various different resource types that are utilized as part of a single department, function, or business unit within an organization (e.g., as the department may have some servers, some network routers, some storage devices, and some user accounts which would have to be individually identified within the larger groups of servers, network routers, storage devices, and user accounts in order to apply the same policy). In various embodiments, multiple hierarchies of the same resource data objects may be maintained so that policies may be optimally applied to different arrangements of the same resource data objects. Consider the example given above, instead of individually identifying the servers, network routers, storage devices, and user accounts in order to apply the same policy in the larger groups of servers, network routers, storage devices, and user accounts, a different hierarchy of resource data objects that groups resource data objects by department may allow for a policy applied to the department node in the hierarchy to have the policy inherited and thus applied for each of those resource data objects in the same department (and not apply the policy to those resource data objects not in the department).

FIG. 1 is a logical block diagram illustrating different hierarchies of resource data objects for managing system resources, according to some embodiments. Data store 110 may store a collection of resource data objects 112. Resource data objects 112 may describe resources 142 implemented as part of system 140. For example, resource data objects 112 may be files, data structures, records, or other data that describe physical system resources, such as computing devices (e.g., servers), networking devices, or storage devices, or virtual system resources, such as user accounts, user data (e.g., data objects such as database tables, data volumes, data files, etc.), user resource allocations (e.g., allocated resource bandwidth, capacity, performance, or other usage of system resources as determined by credits or budgets), virtual computing, networking, and storage resources (e.g., compute instances, clusters, or nodes), or any other component, function or process operating in system 140. Various controls, actions, configurations, operations, or other definitions of the behavior of resources 142 may be managed by applying policies 150 to one or more of the resource data objects so that when various operations are performed by or on behalf of resources 142 in system 140, a lookup operation may be performed to determined which policies are applied to the resource data object corresponding to a given resource. In this way, management of resources 142 may be separately described and maintained for resources 142, allowing for the behaviors of resources 142 applied by policies to be easily applied, configured, changed, or enforced with respect to individual resources 142, without having to modify the resources 142 directly to enforce policies.

FIG. 1 illustrates that different hierarchies 120 of resource data objects 112 may be maintained. For example, hierarchy of resource data objects 120a is configured to maintain the groupings of resource data objects 112 differently than in hierarchy of resource data objects 120b. Consider a scenario where hierarchy of resources 120a arranges user accounts represented by the resource data objects 112 by user title in an organization (e.g., senior vice-president, vice-president, director, manager, team lead, etc.). Hierarchy 120a may be accessed and configured to apply different data access policies to user accounts based on user title (e.g., granting user accounts with higher titles greater data access and user accounts with lower titles lesser data access) by applying the different data access policies to different groups within the hierarchy (e.g., by applying a particular data access policy to a group with a particular user title, all user accounts that are members of the group as maintained in hierarchy 120a would inherit the application of that data access policy). However, in order to apply cost allocation policies (e.g., policies that define the budgets, monetary accounts or funds, or other resources expended to perform various operations), hierarchy of resources 120b may arrange user accounts by business unit or function (e.g., product category A, product category B, engineering, finance, legal, etc.) so that by applying a cost allocation policy to the different business units or functions, the costs incurred by user accounts grouped in the same department (e.g., vice-president, director, manager, team lead, etc. in product category B) may be deducted or obtained from a specific budget or monetary account. Because user accounts in hierarchy 120b may be arranged by business unit, hierarchy 120b may be easily updated to apply particular cost allocation policies to different business units or functions (e.g., by applying a particular data access policy to a group with a particular business unit or function, all user accounts that are members of the group as maintained in hierarchy 120a would inherit the application of that cost allocation policy).

Maintaining different hierarchies 120 allows for the application of policies 150 to be more efficiently optimized. In large scale systems, such as provider network 200 discussed below with regard to FIG. 2, hundreds of thousands or millions of resources may be managed. Optimized arrangement of the different resources in different hierarchies allows for more efficient application of policies to the resources described by the resource data objects in the different hierarchies, as noted in the example scenario given above. In turn policy lookup mechanisms for the resources may be automated so that changes or updates to policies may be applied to the hierarchies of the resource data objects, and enforced upon demand for resources when lookup operations for the resources are performed.

Hierarchies may also allow for the management of resources to be more easily distributed to different users. For example, access to hierarchies may be limited to specific users, so that users that manage system resources using one hierarchy may not have to understand other arrangements of resource data objects or other policies applied in other hierarchies, effectively providing isolation between hierarchies. In this way, modifications to hierarchies (e.g., such as changes to the arrangement of resource data objects or application of policies) may be made concurrently without interfering with other resource management changes. For instance, security changes may be made to a security hierarchy while changes to a cost allocation hierarchy are made without encountering conflicts (e.g., read or write locks on resource data objects that prevent changes from being performed). Moreover, access to sensitive management information (e.g., security policies or cost allocation information) may be limited by restricting the users able to view or change a hierarchy, so that users without access permission for a hierarchy may not view or make changes to the hierarchy. For example, client 130a may present identification credentials that grant permission to access hierarchy 120a, while client 130b may present identification credentials that grant permission to access hierarchy 120b. However, if client 130b were to present the same identification credentials to access hierarchy 120a, client 130b may be denied access to hierarchy 120a as the presented identification credentials may not be granted access to hierarchy 120a.

In some embodiments, the application of policies or arrangement of resources data objects may be limited by the type or creator of the hierarchy. For instance, security policies may only be applied to a hierarchy created by a user with the appropriate credentials for managing resource security policies. In some embodiments, certain policies or types of policies may be subject to application limitations. For instance, only one instance of a cost allocation policy may be applied at one out of multiple hierarchies (so that other hierarchies may not have conflicting cost allocation policies applied).

Please note, FIG. 1 is provided as a logical illustration of maintaining different hierarchies of resource data objects, and is not intended to be limiting as to the physical arrangement, size, or number of components, modules, or devices, implementing a data store, system or clients or the number, type, or arrangements of hierarchies or resource data objects. For example, in some embodiments, resource data objects may be assigned to or members of different groups, which are also nodes in a hierarchy. Different arrangements of groups, containers, or other collections of resource data objects may be implemented for each hierarchy. In some embodiments, not all resource data objects may be present in every hierarchy.

The specification first describes an example of a provider network implementing multiple different resources as part of offering different services to clients of the provider network. The provider network may also implement a resource management service that maintains different hierarchies of resource data objects for managing provider network resources corresponding to the resource data objects, according to various embodiments. Included in the description of the example resource management service are various aspects of the example resource management service along with the various interactions between the resource management service, other services in the provider network, and clients of the provider network. The specification then describes a flowchart of various embodiments of methods for maintaining different hierarchies of resource data objects for managing provider network resources. Next, the specification describes an example system that may implement the disclosed techniques. Various examples are provided throughout the specification.

Figure 2:
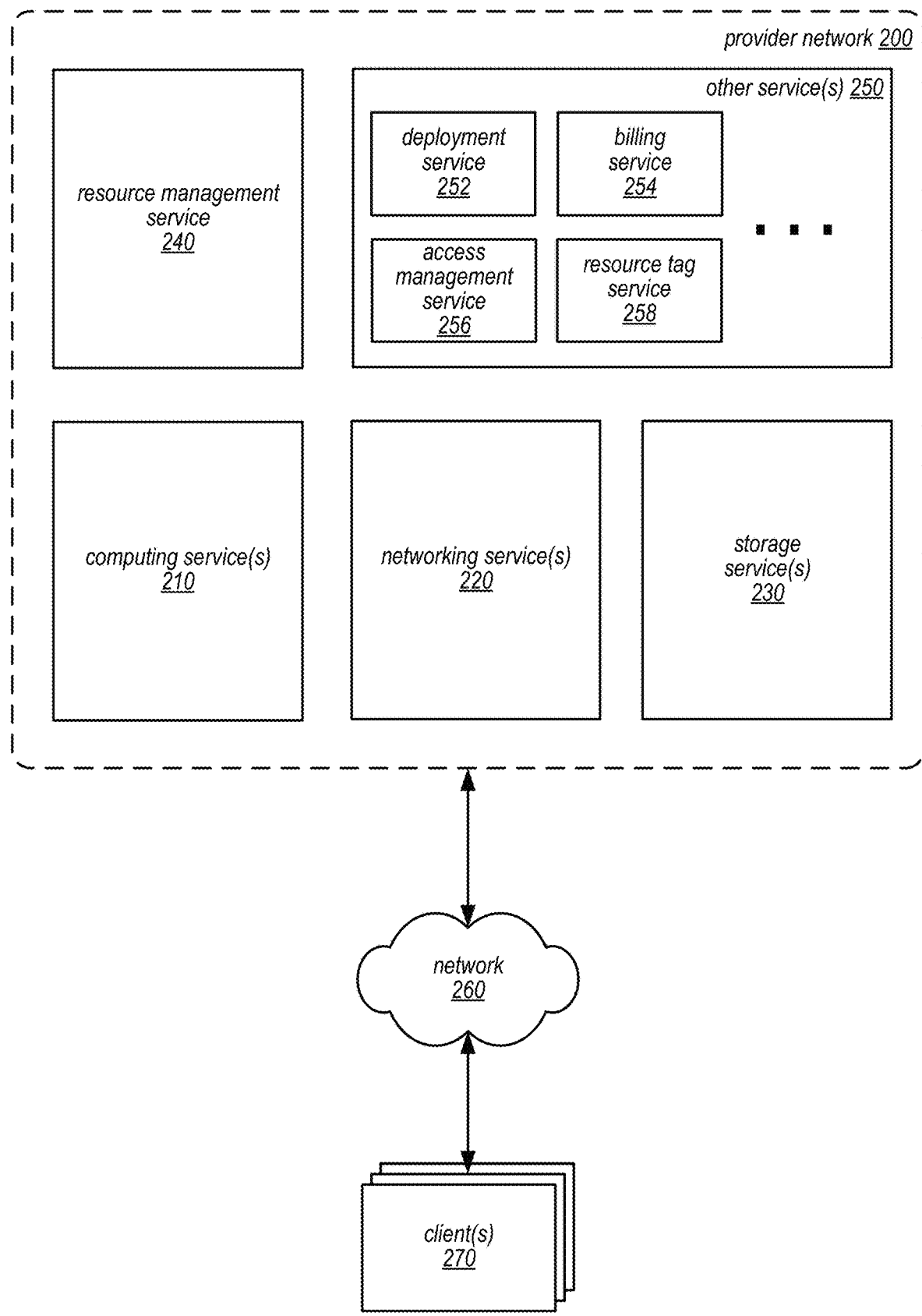
FIG. 2 is a logical block diagram illustrating a provider network that implements a resource management service that provides different hierarchies of resource data objects for managing provider network resources, according to some embodiments.

FIG. 2 is a logical block diagram illustrating a provider network that implements a resource management service that provides different hierarchies of resource data objects for managing provider network resources, according to some embodiments. Provider network 200 may be set up by an entity such as a company or a public sector organization to provide one or more services (such as various types of cloud-based computing or storage) accessible via the Internet and/or other networks to clients 270. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In some embodiments, provider network 200 may implement computing service(s) 210, networking service(s) 220, storage service(s) 230, resource management service 240 (which is discussed in detail below with regard to FIGS. 3-7), and/or any other type of network based services 250 (which may include various other types of storage, processing, analysis, communication, event handling, visualization, and security services as well as services for operating the services offered by provider network 200, including deployment service 252, billing service 254, access management service 256, and resource tag service 258). Clients 270 may access these various services offered by provider network 200 via network 260. Likewise network-based services may themselves communicate and/or make use of one another to provide different services. For example, various ones of computing service(s) 210, networking service(s) 220, storage service(s) 230, and/or other service(s) 250 may lookup policies applied to resource data objects in different hierarchies maintained as part of resource management service 240 describing resources in the services in order to enforce behaviors, actions, configurations, or controls indicated in the policies.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the resource management service or a component of the computing service) may be implemented by a particular node or may be distributed across several nodes. In some embodiments, a given node may implement the functionality of more than one service system component (e.g., more than one storage service system component).

Computing service(s) 210 may provide computing resources to client(s) 270 of provider network 200. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 270 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

Networking service(s) 220 may implement various networking resources to configure or provide virtual networks, such as virtual private networks (VPNs), among other resources implemented in provider network 200 (e.g., instances of computing service(s) 210 or data stored as part of storage service(s) 230) as well as control access with external systems or devices. For example, networking service(s) 220 may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220 may manage or configure the internal network for provider network 200 (and thus may be configured for implementing various resources for a client 270). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 270 may be attached to the overlay network so that when a client 270 provides an IP address that they want to send packets to, the IP address is run in virtual space by communicating with a mapping service (or other component or service not illustrated) that knows where the IP overlay addresses are.

Storage service(s) 230 may be one or more different types of services that implement various storage resources to provide different types of storage. For example, storage service(s) 230 may be an object or key-value data store that provides highly durable storage for large amounts of data organized as data objects. In some embodiments, storage service(s) 230 may include an archive long-term storage solution that is highly-durable, yet not easily accessible, in order to provide low-cost storage. In some embodiments, storage service(s) 230 may provide virtual block storage for other computing devices, such as compute instances implemented as part of virtual computing service 210. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) 230 may replicate stored data across multiple different locations, fault tolerant or availability zones, or nodes in order to provide redundancy for durability and availability for access.

In some embodiments, storage service(s) 230 may include resources implementing many different types of databases and/or database schemas. Relational and non-relational databases may be implemented to store data, as well as roworiented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

In some embodiments, storage service(s) 230 may implement a hierarchical data storage service, such as hierarchical data store 350 in FIG. 3 discussed below. A hierarchical data storage service may store, manage, and maintain hierarchical data structures, such as a directory structure discussed below with regard to FIG. 5. Clients of a hierarchical data storage service may operate on any subset or portion of a hierarchical data structure maintained in the data storage service with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical data structure (e.g., reading parts of the hierarchical data structure, adding a node, and indexing some of the node's attributes, while imposing the requirement that the resulting updates of the operations within the transaction are isolated, consistent, atomic and durably stored). As discussed below, in at least some embodiments, the hierarchical data stored in a hierarchical data storage service may be multiple hierarchies of resource data objects on behalf of resource management service 240.

In various embodiments, provider network 200 may implement various other service(s) 250, including deployment service 252. Deployment service 252 may include resources to instantiate, deploy, and scale other resources (from other network-based service, such as computing service(s) 210, networking service(s) 220, and/or storage service(s) 230) to implement a variety of different services, applications, or systems. For example, deployment service 252 may execute pre-defined deployment schemes which may be configured based, at least in part, on policies applied to resources launched by the deployment service 252 (e.g., a policy that describes the hardware and software configuration of virtual compute instance launched on behalf of particular user account).

Provider network 200 may also implement billing service 254 which may implement components to coordinate the metering and accounting of client usage of network-based services, such as by tracking the identities of requesting clients, the number and/or frequency of client requests, the size of data stored or retrieved on behalf of clients, overall resource bandwidth used by clients, class/type/number of resources requested by clients, or any other measurable client usage parameter. Billing service 254 may maintain a database of usage data that may be queried and processed by external systems for reporting and billing of client usage activity. Similar to deployment service 252, policies applied to resource data objects in hierarchies managed by resource management service 240 may indicate payment accounts, budgets, or responsible parties for which the usage data is to be reported and/or billed.

Provider network may also implement access management service 256, which may implement user authentication and access control procedures defined for different resources (e.g., instances, user accounts, data volumes, etc.) as described by policies applied to resource data objects in hierarchies at resource management service 240. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Provider network 200 may also implement resource tag service 258, which may manage resource attributes for resources of other services (e.g., computing service(s) 210, networking service(s) 220, and/or storage service(s) 230). Resource attributes may be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services may create resource metadata and/or attributes when a resource is created by a client. However, a client may wish to modify, remove, and/or add new resources attributes to the resource metadata in order to provide greater flexibility for automating various interactions within the resources utilizing resource metadata. Resource tag service 258 may lookup policies for different resources to determine which resource attributes are to be maintained for the different resources, in some embodiments.

Generally speaking, clients 270 may encompass any type of client configurable to submit network-based services requests to provider network 200 via network 260, including requests for directory services (e.g., a request to create or modify a hierarchical data structure to be stored in directory storage service 220, etc.). For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with network-based services platform 200. In some embodiments, client 270 may be configured to generate network-based services requests according to a Representational State Transfer (REST)-style network-based services architecture, a document- or message-based network-based services architecture, or another suitable network-based services architecture.

In some embodiments, a client 270 may be configured to provide access to network-based services to other applications in a manner that is transparent to those applications. For example, client 270 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 270 and the operating system or file system on behalf of applications executing within the operating system environment.

Clients 270 may convey network-based services requests (e.g., access requests directed to hierarchies in resource management service 240) to and receive responses from network-based services platform 200 via network 260. In various embodiments, network 260 may encompass any suitable combination of networking hardware and protocols necessary to establish network-based-based communications between clients 270 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and network-based services platform 200. It is noted that in some embodiments, clients 270 may communicate with network-based services platform 200 using a private network rather than the public Internet.

Figure 3:
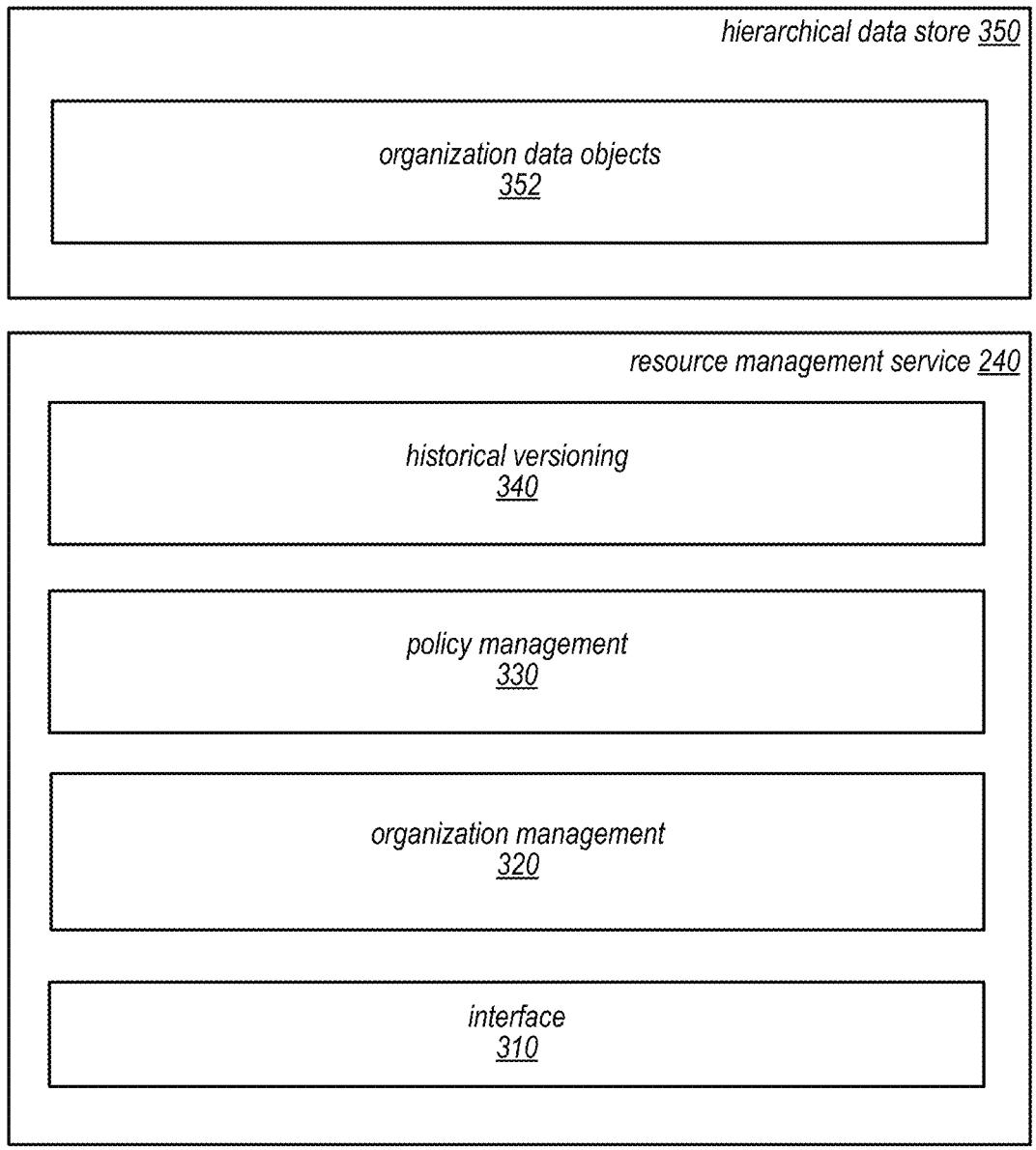
FIG. 3 is a logical block diagram illustrating a resource management service and a hierarchical data store, according to some embodiments.

FIG. 3 is a logical block diagram illustrating a resource management service and a hierarchical data store, according to some embodiments. Resource management service 240 may manage the application of policies to resource data objects for resources in provider network 200. As provider network 200 may offer services to a variety of different customers, a collection or set of resource data objects that are managed together may identified as an organization (although various other terms including entity, domain, or any other identifier for the collection of resource data objects may also be used). Resource management service 240 may provide various capabilities to clients of resource management service 240 to create and manage respective organizations which includes the resource data objects describing the resources of provider network 200 which are associated with one or more customers of the provider network, including managing which resource data objects (and thus their corresponding resources) are members of an organization. Resource management service 240 may allow for the creation and management of multiple different hierarchies of the resources in an organization. These resources may be further subdivided and assigned into groups (which also may be subdomains, directories, sub-entities, sets, etc.). Groups may consist of any resource that can have a policy applied to it. Resource management service 240 may allow clients to author policies and apply them to the organization, to different groups, or directly to resource data objects.

Resource management service 240 may implement interface 310, which may provide a programmatic and/or graphical user interface for clients to request the performance of various operations for managing system resources via an organization. For example, the various requests described below with regard to FIGS. 6 and 7 may be formatted according to an Application Programming Interface (API) and submitted via a command line interface or a network-based site interface (e.g., website interface). Other requests that may be submitted via interface 310 may be requests to create an organization, update an organization (e.g., by adding other resources, inviting other user accounts to join the organization. In some embodiments, an organization may be treated as a resource owned or controlled by the user account that created it, and that account by default may have access permissions to the organization. The user account could then delegate permissions to other user accounts or users using cross-account access or transfer ownership of the organization, in cases where control needs to move to a delegated group or the owner needs to leave the organization.

Resource management service 240 may implement organization management 320, which may handle the creation of organizations, the updates to or modifications of organizations, the delegation of access permissions to organizations, as well as the arrangement of resource data objects within hierarchies maintained for the organization. For example, upon creation an organization may include a single hierarchy providing an arrangement of resource data objects (e.g., as members of various groups and/or groups within groups, etc.). Resource management 320 may handle the various requests to create additional hierarchies, update hierarchies, or delete hierarchies, as discussed below with regard to FIG. 6. Organization management 320 may also handle requests to add resource data objects to an organization, as discussed below with regard to FIG. 10. For example, organization management 320 may identify which hierarchies a new resource data object should be added to and the location within the hierarchy that the resource data object should be added. In at least some embodiments, organization management may coordinate organization changes between multiple parties, such as adding user accounts to or removing user accounts from an organization and may implement multiparty agreement mechanisms to approve the change to the organization. For example, organization management 320 may facilitate an authenticated 2-way handshake mechanism to confirm or deny a potential change to an organization. Organization manager 240 may expose different mechanisms for multiparty agreements, including emailed invitations, single use tokens, and shared secrets (domains/passwords). When agreement is confirmed, organization management 320 may then perform the agreed upon changes to the organization.

As noted above, policies may be authored or defined and then applied to various resource data objects, groups, or an entire hierarchy of an organization. Resource management service 240 may implement policy management 330 to handle the authoring of policies as well the application of policies. Many different types of policies may be applied in order to define different types of behaviors. Some policy types, for instance, may be related to specific behaviors, resources, or actors. Billing related policies, for instance, may have one or various types of billing policies. Resource configuration policy types (e.g., configuring operational configuration of resources, when deployed by deployment service 252 for instance. Some policy types can define access controls to resources. Policy management 330 may handle various requests to create a policy of one of many policy types, define policy types by authoring a policy schema, and the application of policies to resource data objects, groups, or entire hierarchies within an organization, such as those requests discussed below with regard to FIG. 7.

Policy management 330 may also handle lookup requests for resource data objects, groups, or organizations and perform policy application and conflict resolutions, as discussed below with regard to FIGS. 4 and 9. For example, policies can also be inherited in a chain from the organization down to a group, group of groups, or individual resource data object. If a policy is applied to a parent node in the hierarchy, then the child node (group, group of groups, or individual resource data object) may inherit the policy of the parent node. In this way, the policy applied to the parent node becomes the "default" policy, in the absence of any other policy applications. When there are multiple policies in the inheritance path, for example there is a policy applied at both the hierarchy and group level, then different policies may have different inheritance semantics, which may have to be resolved. In one scenario, access policies may follow the semantics of a set union, where ordering does not matter (e.g., everything is allowed unless explicitly excluded). Billing policies, in another scenario, may implement a "child wins/parent appends" inheritance model where a child policy may be executed, followed by a parent policy. In such scenarios, ordering of policies matters. Thus, policy management 330 may be configured to resolve conflicting policies according to the appropriate inheritance semantics for the policy.

In at least some embodiments, policy management 330 may implement policy validation (although in alternative embodiments validation may be delegated in part or in total to other components). Validation of policies may include syntax validation. Syntax validation checks policies instances of policy types that are authored to determine whether the policy instance is syntactically correct so that the policy can be parsed and evaluated by backend systems that lookup the policy. Syntactic validation may be performed, in some embodiments, when authored. In addition to syntactic validation, some policies may undergo semantic validation. Semantic validation may be performed to ensure that a resource or other information specified in a policy results in a policy that can be enforced. For example, semantic validation could determine whether an AccountId specified in a payer policy is an account in the organization that has a valid payment instrument. In addition to semantically validating the policies themselves, policy management 330 may validate policy applications and organization changes, in order to ensure that the changes do not invalidate policies that are applied within the organization. For example, validation of changes to ensure that a payer for an organization doesn't leave the organization. As each policy may have different semantic validation logic, each policy may have a separately configurable semantic validator.

Resource management service 240 may implement historical versioning of hierarchies in organizations, in some embodiments. Some services, such as billing service 254, may require the ability to query for historically versioned data, such as which account was the payer of the organization at the end of the previous month (as the current payer may be different due to a change to a hierarchy). In order to provide historical versions of hierarchies (including the policies applied and resource data objects arranged), historical versioning 340 may store prior versions or track or record changes to hierarchies. These prior versions or changes may be associated with particular points in time (e.g., by assigning timestamps). Historical versioning 340 may handle requests for policy lookups across particular ranges of time or at particular points in time. Historical versioning 340 may access the versioned data and return the appropriate policies for the specified time(s). Hierarchy versions may be stored as part of organization data objects 352 in hierarchical data store 350, in some embodiments.

Hierarchical data store 360 may provide data storage for organization data objects 362, including the resource data objects, policy data objects, and any other data describing the organization, including the multiple hierarchies of the resource data objects, as discussed below with regard to FIG. 5. The organization data objects 352 may be maintained within a single hierarchical data structure, though different hierarchies of resource data objects within the single hierarchical data structure may be provided for managing resource data objects, as discussed below with regard to FIG. 5.

Figure 4:
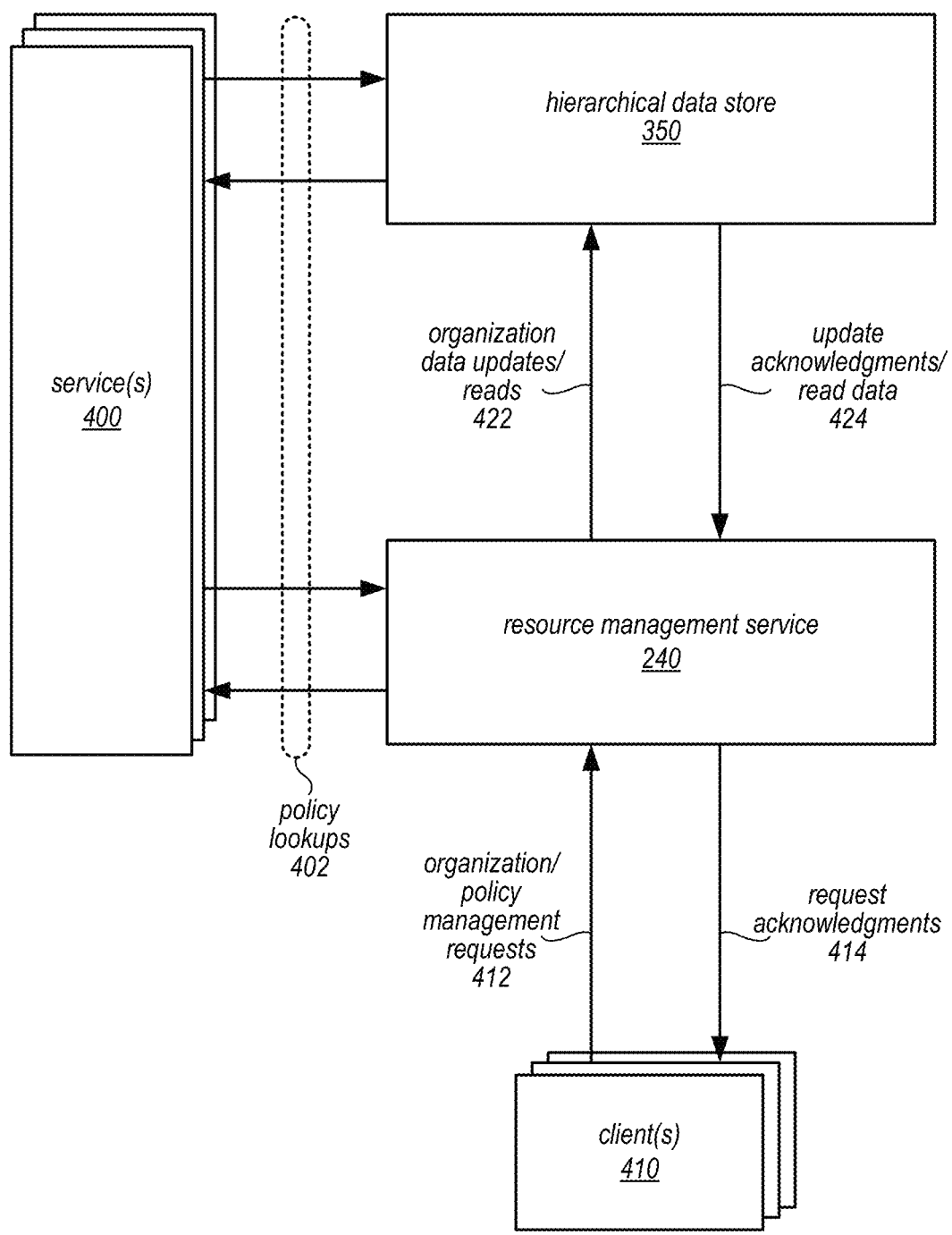
FIG. 4 is a logical block diagram illustrating interactions between clients and a resource management service and between a resource management service and other services, according to some embodiments.

FIG. 4 is a logical block diagram illustrating interactions between clients and a resource management service and between a resource management service and other services, according to some embodiments. As noted above, clients may interact with resource management service 240 to manage resources. For example, client(s) 410 may submit various organization/policy management requests 412 (e.g., to modify a hierarchy by arranging resource data objects or applying/removing policies). In turn resource management service 240 may identify the appropriate updates to organization data to be made or to be read, and send organization data updates/reads 422 to hierarchical data storage 350. Hierarchical data storage 350 may execute the received requests to change hierarchical data structures storing the organization data objects in accordance with the update request or retrieve the appropriate data read from the organization data objects according to the hierarchies, and return update acknowledgements/read data 424 to resource management service 240. In turn, resource management service 240 may return the appropriate acknowledgments (e.g., indicating success or failure of the requests.

Service(s) 400 may perform policy lookups 402 with respect to resource data objects corresponding to resources under the control or responsibility of service(s) 400, in various embodiments. For example, an access control service, such as access management service 256, may lookup the access policies for a particular resource (e.g., compute instance or user account) in order to permit or deny an access request. When launching new resources, network configuration information may be maintained in a policy that is applicable to the launched resource and may be retrieved by a policy lookup 402 from a service 400. Policy lookups 402 may be requested via resource management service 240 or, in some embodiments, may be requested directly from the service to the hierarchical data store 350. Latency sensitive services, for instance, may implement local libraries, agents, or interpreters for the organization data maintained at hierarchical data store 350 in order to reduce the number of requests that have to be sent in order to perform a policy lookup.

Figure 5:
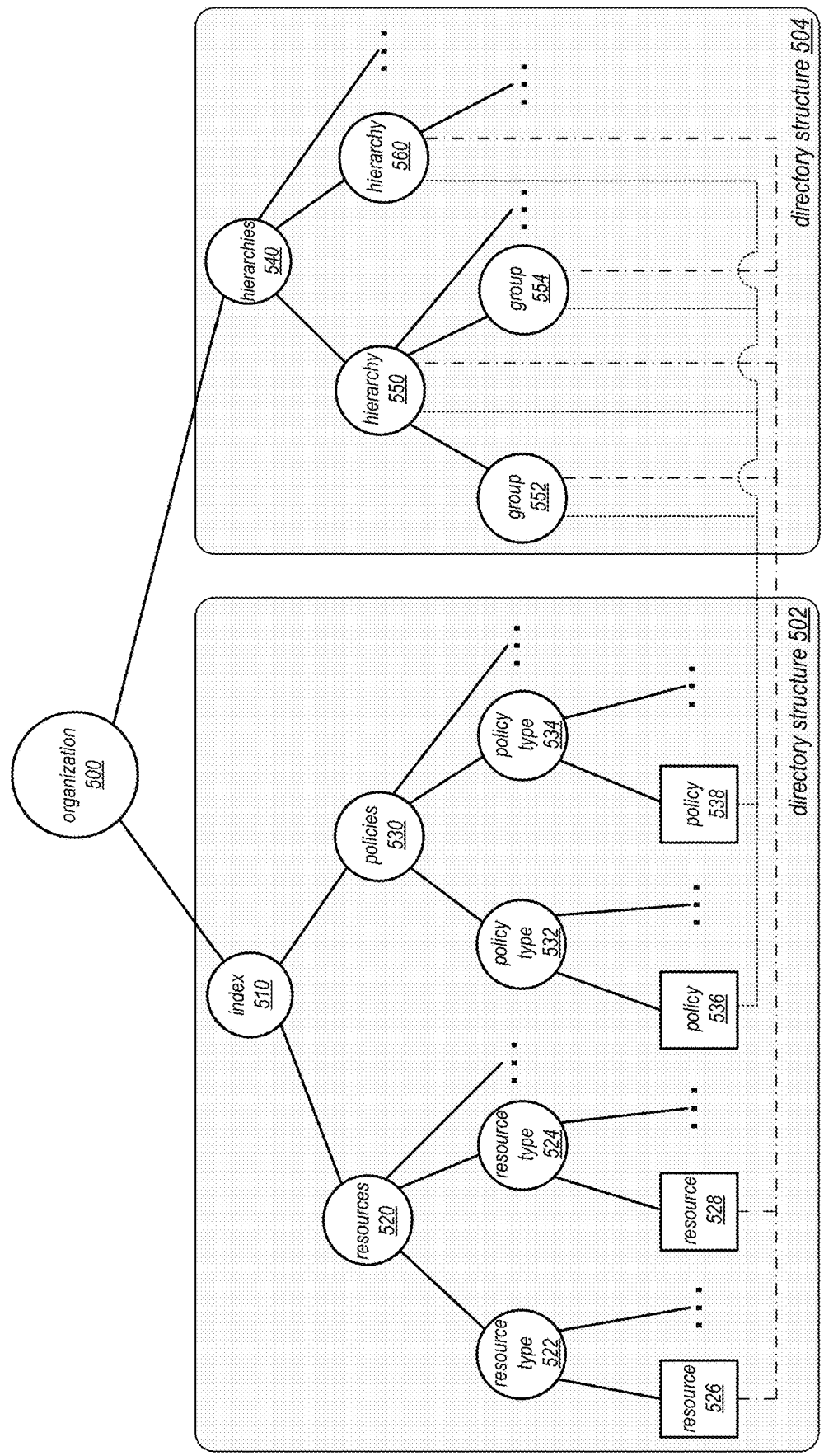
FIG. 5 is a logical illustration of directory structures that may store resource data objects and hierarchies of resource data objects in a hierarchical data store, according to some embodiments.

FIG. 5 is a logical illustration of directory structures that may store resource data objects and hierarchies of resource data objects in a hierarchical data store, according to some embodiments. Organization data objects (including policy data objects, resource data objects, groups or groups of groups of data objects) may be maintained in one or multiple directory structures, in various embodiments. For example, organization 500 may utilize directory structure 502 to store the resources and policies that are part of the organization. Index node 510 may provide information for performing a lookup to determine the location of a resource data object or policy data object. Resources node 520 may group resources into various resources types 522 and 524 (e.g., user accounts, virtual compute instances, storage volumes, VPNs, load balancers, etc.) and within the resource types 522 and 524 may be found resource data objects 526 and 528 describing individual resources in the provider network. Similarly, policies node 530 may include different policy types 532 and 534 (which may be created by clients as discussed above). Individual instances of the policy types 536 and 538 may be policy instances applied to resource data objects, groups, groups of groups, or hierarchies.

Organization 500 may also utilize directory structure 504 to maintain different hierarchies of resource data objects and policy data objects. Hierarchies node 540 may be the group of hierarchies maintained for organization 500, including hierarchy 550 and hierarchy 560. Within each hierarchy, groups, 552 and 554 or groups of groups, and/or any arrangement of resources included in the group of resources 520 may be linked (as illustrated by the dotted lines) to indicate membership in the group. Similar policies, such as policies 536 and 538 may be linked to hierarchies, groups or groups of groups, or individual resource data objects within the hierarchies.

Different types of hierarchical data structures, such as directory structures 502 and 504, may be stored, managed, and or represented in order to maintain organization 500. For example nodes in a hierarchy (e.g., the circle or square shapes) may have a globally unique identifier (GUID), zero or more attributes (key, value pairs), and zero or more links to other nodes. In some embodiments, a group or directory may be one type of node which has zero or more child links to other nodes, either groups/directories or resource data objects/policy data objects. Group nodes may have zero or one parent directory node, implying that directory nodes and links define a tree structure, in some embodiments, as depicted in FIG. 5. Index 510, hierarchies 540, resources 520, policies 530, hierarchy 550 and 560, resource type 522 and 524, policy type 532 and 534, and group 552 and 554 may be group/directory nodes. Node 500, organization node, may be a root node that is the logical root multiple directory structures and may not be visible to clients of resource management service (which may access individual hierarchies). Resource and policy nodes (represented by squares such as resource node) may be leaf nodes in a directory structure 410. Leaf nodes may have a unique external Id (e.g., client specified) and client-defined attributes. Leaf nodes can have more than one parent node so that resource data objects and policy data objects can be linked to multiple hierarchies. In some embodiments, all resource data objects are linked to all hierarchies (though in different arrangements as defined by a user), whereas in other embodiments, resource data objects may be linked to only some hierarchies.

In some embodiments, a link may be a directed edge between two nodes defining a relationship between the two nodes. There may be many types of links, such as client visible link types and another link type for internal hierarchical data store operation. In some embodiments, a child link type may create a parent—child relationship between the nodes it connects. For example, child link can connect resource type node 522 to resource 526. Child links may define the structure of directories (e.g., resources 520, policies 530, hierarchies 540). Child links may be named in order to define the path of the node that the link points to. Another type of client visible link may be an attachment link. An attachment link may apply a resource data object or policy data object to another node (e.g., group 552, hierarchy 550, etc.) as depicted by the dotted lines. Nodes can have multiple attachments. In some embodiments, some attachment restrictions may be enforced, such as a restriction that not more than one policy node (e.g., policy 536) of policy type 532 can be attached to a same node. A non-visible type of link or implied link type may also be implemented in some embodiments, a reverse link. Reverse links may be used for optimizing traversal of directory structures for common operations like look-ups (e.g., policy lookups).

In various embodiments, data objects or nodes in organization 500 can be identified and found by the pathnames that describe how to reach the node starting from the logical root node 500, starting with the link labeled "/" and following the child links separated by path separator "/" until reaching the desired node. For example, resource 526 can be identified using the path: "/index510/resources520/resource526". As some nodes may be children of multiple directory nodes, multiple paths may identify the node. For example, the following path can also be used to identify resource 526: "/hierarchies540/hierarchy550/group 552". Please note that the illustration in FIG. 5 provides many examples of the possible ways in which policy data objects or lease data objects may be linked. As noted earlier, not all policies may be attached to all hierarchies or all resource data objects to all hierarchies and thus the illustrated links are not intended to be limiting. Similar, directory structures may be differently arrange so that a single directory structure or greater number of directory structures are utilized.

Figure 6:
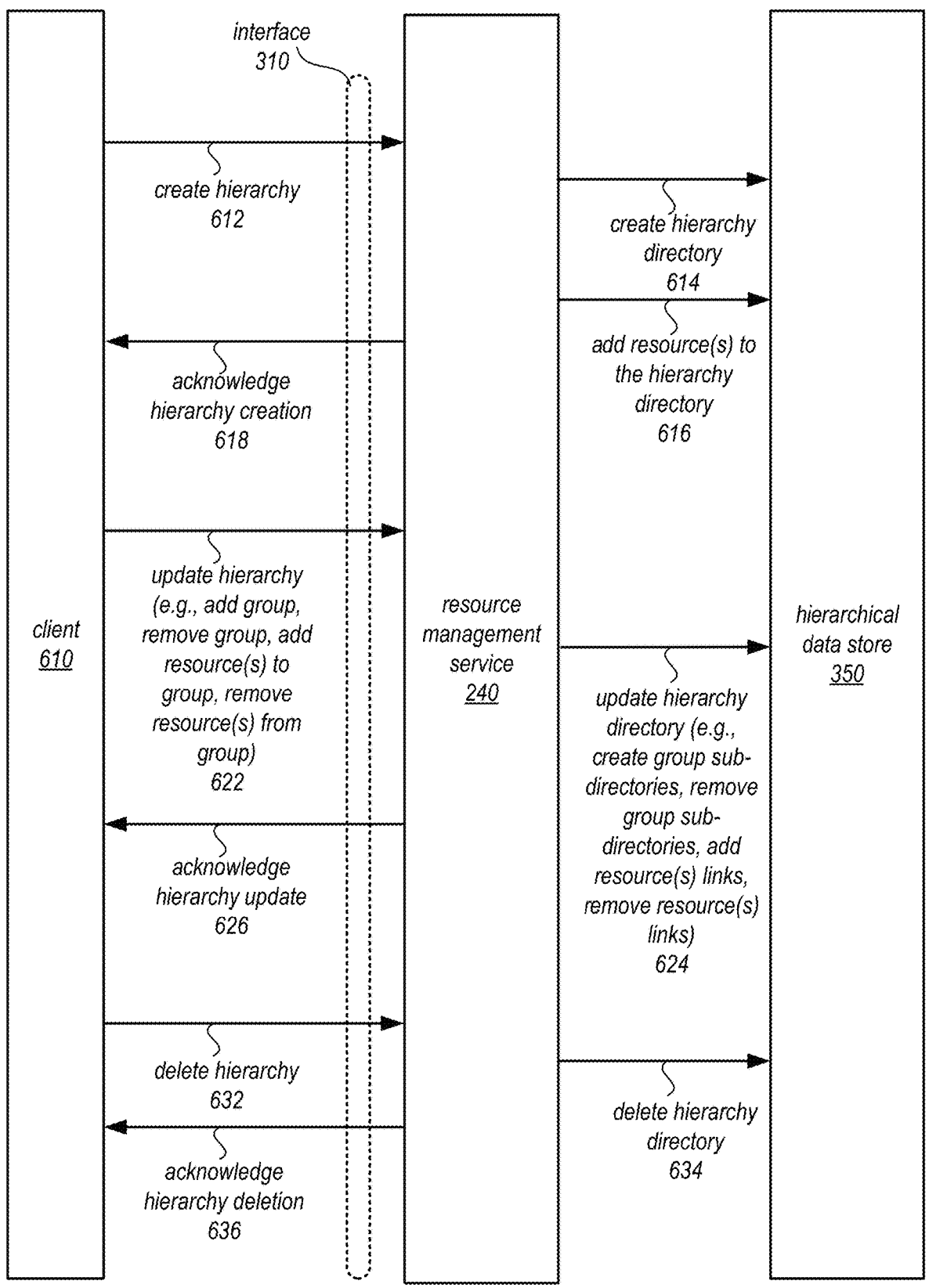
FIG. 6 illustrates interactions to manage hierarchies at a resource management service, according to some embodiments.

FIG. 6 illustrates interactions to manage hierarchies at a resource management service, according to some embodiments. Clients may submit a create hierarchy request 612 via interface 310. The creation request 612 may include a membership policy which provides for a default arrangement of resources data objects that are automatically added to the hierarchy (e.g., as a result of adding the resource to the organization) or the membership policy may be included as part of a separate request. Resource management service 240 may create a hierarchy directory 614 in hierarchical data store 350, and then send requests to add resources to the hierarchy directory 616 (e.g., by adding links between resource data objects and the new hierarchy directory). Resource management service 240 may then acknowledge the hierarchy creation 618 to client 610.

Client 610 may submit a request to update the hierarchy 622. Hierarchy update requests may include various requests to add a group, remove a group, add resources to a group, remove resource(s) from a group, add a group to a group, remove a group from a group, or any other arrangement modification to the hierarchy. In turn, resource management service 240 may send an update hierarchy directory request 624 to perform one or more corresponding actions, such as requests to create group sub-directories, remove group sub-directories, add resource data object link(s), or remove resource data object link(s). Upon completion or failure of the requests, resource management service 240 may acknowledge the hierarchy update 626 (which may indicate success or failure).

Client 610 may submit a request to delete a hierarchy 632 to resource management service 240. Resource management service 240 may send a request to delete the hierarchy directory (which may delete any group(s), or group(s) of groups within the hierarchy but not resource data objects or policy data objects which may only be linked to the deleted directory). Instead, the links may be removed (e.g., by hierarchical data store 360 when one of the linked nodes is deleted).

Figure 7:
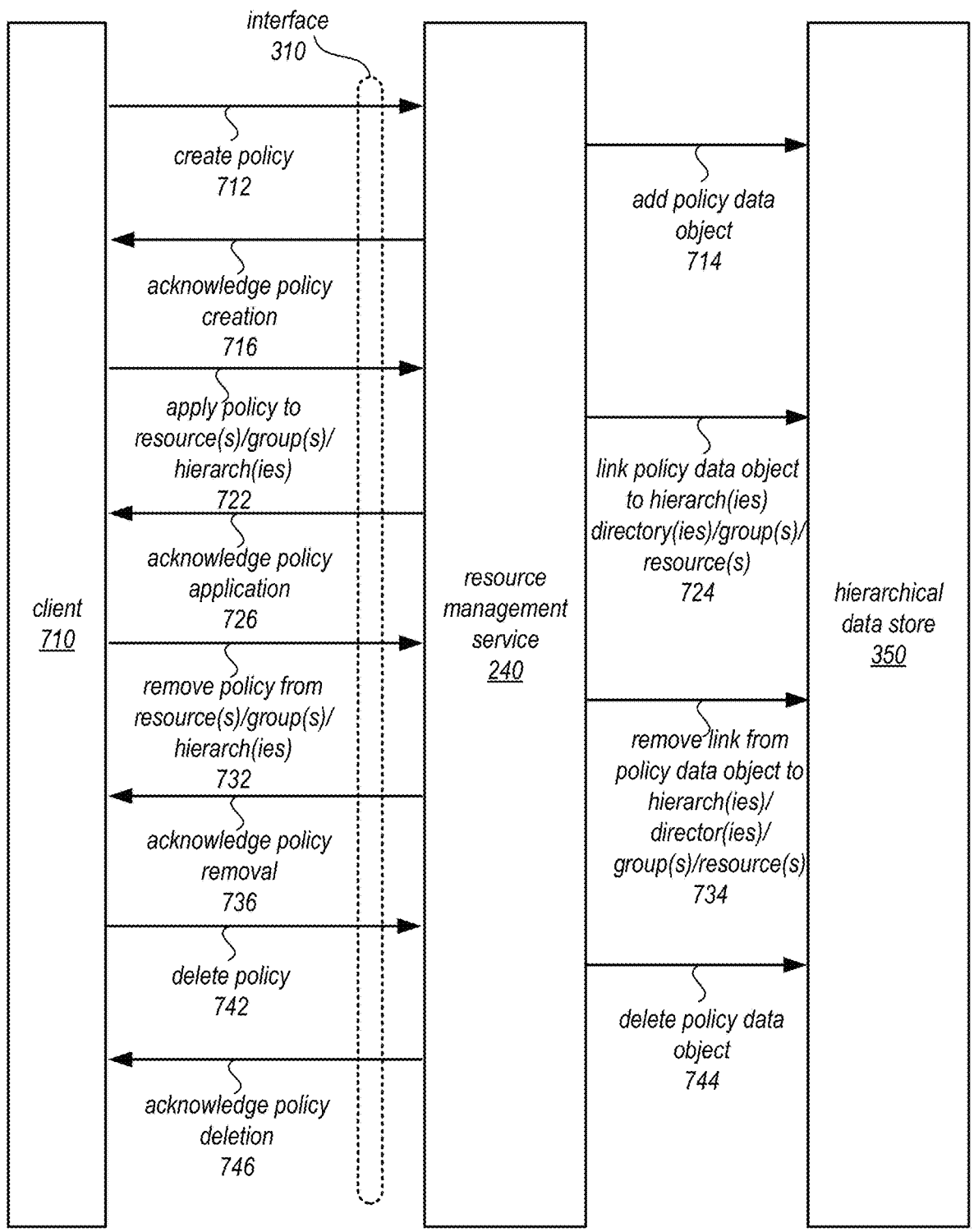
FIG. 7 illustrates interactions to manage policies within hierarchies at a resource management service, according to some embodiments.

FIG. 7 illustrates interactions to manage policies within hierarchies at a resource management service, according to some embodiments. Client 710 may submit a request to create a policy 712. For example, the creation request may include a policy definition or content, including an indication of policy type, so that validation of the policy can be performed, as discussed above. Resource management service 240 may add a policy data object 714 representing the policy to hierarchical data store 350 (e.g., storing the policy data object as a new policy data object in the policy directory for the organization). An acknowledgment 716 indicating policy creation success or failure may be returned from resource management service 240 to client 710

Client 710 may send a request to apply a policy to one or more resource data objects, groups, or hierarchies 722. In turn, resource management service 240 may send a request to link the policy data object to the hierarchy directory(ies), group(s), or resource data object(s) 724. Resource management service 240 may then acknowledge the application 726 to client 710. Similarly, client 710 may send a request to remove the policy from one or more resource data objects, groups, or hierarchies. Resource management service 240 may then send a request to remove the link from the policy data object to the requested hierarchy director(ies), group(s) or resource data object(s). Client 710 may send a request 742 to delete a policy. Resource management service 240 may send a request to delete the policy data object 744 and acknowledge the policy deletion 746 to client 710.

Figure 8:
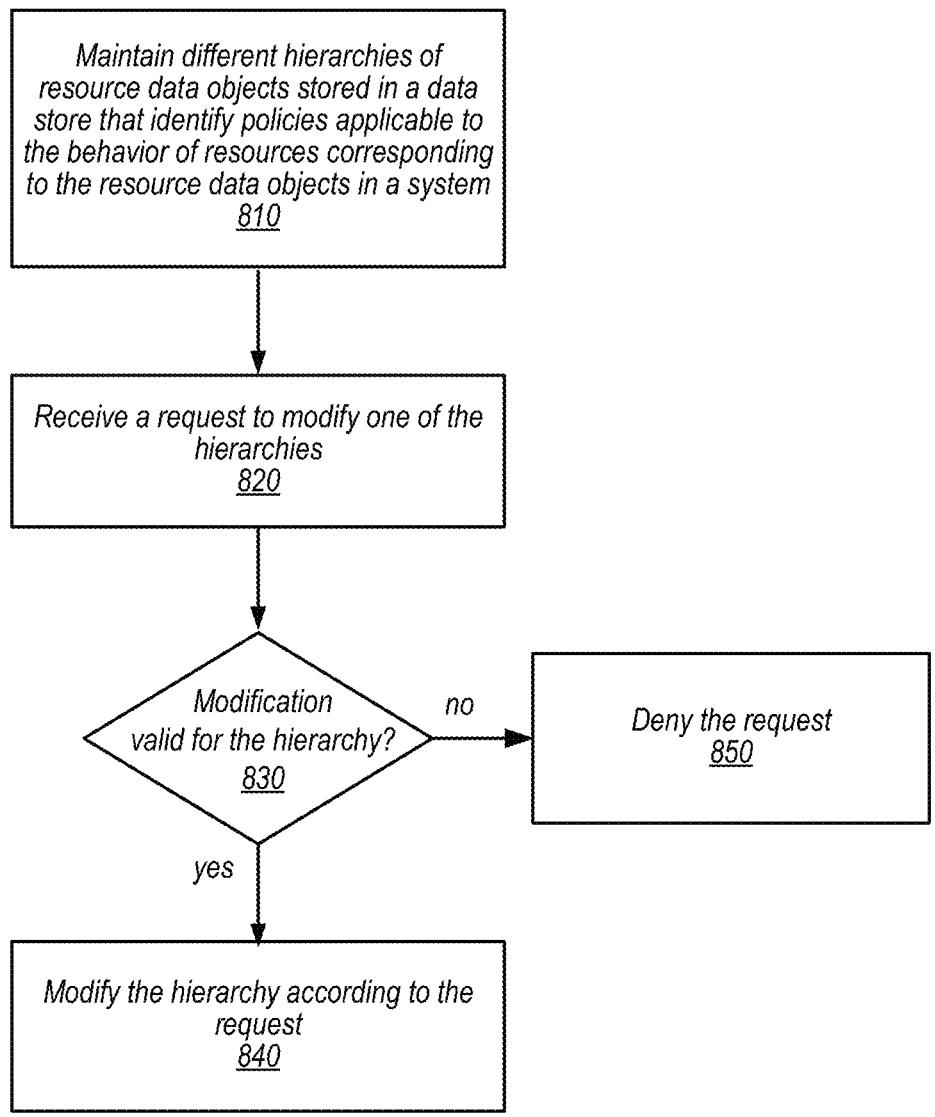
FIG. 8 is a high-level flowchart illustrating methods and techniques to implement maintaining different hierarchies of resource data objects for managing system resources, according to some embodiments.

Although FIGS. 2-7 have been described and illustrated in the context of a provider network implementing a resource management service for resources of multiple different services in the provider network, the various components illustrated and described in FIGS. 2-7 may be easily applied to other resource management systems, components, or devices. For example, private systems and networks implementing multiple system resources may maintain multiple hierarchies of resource data objects for managing the behavior of the system resources. As such, FIGS. 2-7 are not intended to be limiting as to other embodiments of a system that may implement resource management system for system resources. FIG. 8 is a high-level flowchart illustrating methods and techniques to implement maintaining different hierarchies of resource data objects for managing system resources, according to some embodiments. Various different systems and devices may implement the various methods and techniques described below, either singly or working together. For example, a resource management service such as described above with regard to FIGS. 2-7 may be configured to implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, different hierarchies of resource data objects stored in a data store may be maintained. The resource data objects may identify policies applicable to the behavior of resources corresponding to the resource data objects in a system. For example, resource data objects may be maintained to describe system resources (e.g., unique identifier, capabilities, roles, availability, etc.). The resource data objects may be separately arranged in different hierarchies so that policies applied to the resource data objects according to the hierarchies (e.g., by inheritance rules or direct application) may enforce the controls, actions, configurations, operations, or other definitions of the behavior of the corresponding resources. The hierarchies may be maintained in a hierarchical data storage system, as described above with regard to FIG. 3. However, other types of data stores may be implemented to maintain the hierarchies (e.g., by maintaining the data objects, and relationships between the data objects that define the hierarchy so that the hierarchy can be determined).

As indicated at 820, a request to modify one of the hierarchies may be received. A modification to a hierarchy may include a modification to the arrangement of a hierarchy. For example, resource data objects may be reassigned from one group to another, new groups or groups of groups may be created, groups or groups of groups may be deleted, or any other change to the relationships of resource data objects among the hierarchy may be performed, such as the requests discussed above with regard to FIG. 6. A modification to a hierarchy may also include a change to the application of a policy within the hierarchy, by applying a new policy, removing a policy, changing the application of an existing policy, or changing the definition of a policy, such as the requests discussed above with regard to FIG. 7.

As indicated at 830, in at least some embodiments, a check or determination may be made as to whether the modification is valid for the hierarchy. For example, limitations on policy application may be checked. If, the policy may only be applied once to the resource data object, group, or hierarchy, then it may be determined whether an instance of the policy has already been applied to resource data object, group, or hierarchy. If so, then, as indicated by the negative exit from 830, the request may be denied, as indicated at 850. Some modifications may not be permitted in certain hierarchies. For example, a security policy may not be applied in a hierarchy associated with human resources or finance, but only in a hierarchy associated with security. In some scenarios, certain organization modifications may not be allowed (e.g., adding a resource data object to more than one group in a hierarchy—although this may be allowed in other embodiments, or deleting resource data objects). Authentication may be implemented in some embodiments, to determine the identity of a user account associated with a client submitting a modification. If the user account is not permitted to perform the modification to the hierarchy, then the modification may be invalid.

For valid modifications, as indicated by the positive exit from 830, the modification to the hierarchy may be performed in accordance with request, as indicated at 840. Modifying hierarchies may change the application of policies applied within the hierarchy. If, for instance, resource data objects are moved or reassigned, then different policies may be inherited by those moved resource data objects based on the different group assignments. If new policies are applied as result of the modification, then the new policy may be applied along with existing policies, or in the scenario where the modification is a policy removal, then removed policy is no longer included in those policies applied by the hierarchy. However, modifications to one hierarchy may be isolated to that hierarchy, and thus may be made without modifying the application of policies identified in another hierarchy. In at least some embodiments, other modifications may be made to multiple, if not all, hierarchies, such as adding a resource data object to multiple different hierarchies as discussed below with regard to FIG. 10.

Figure 9:
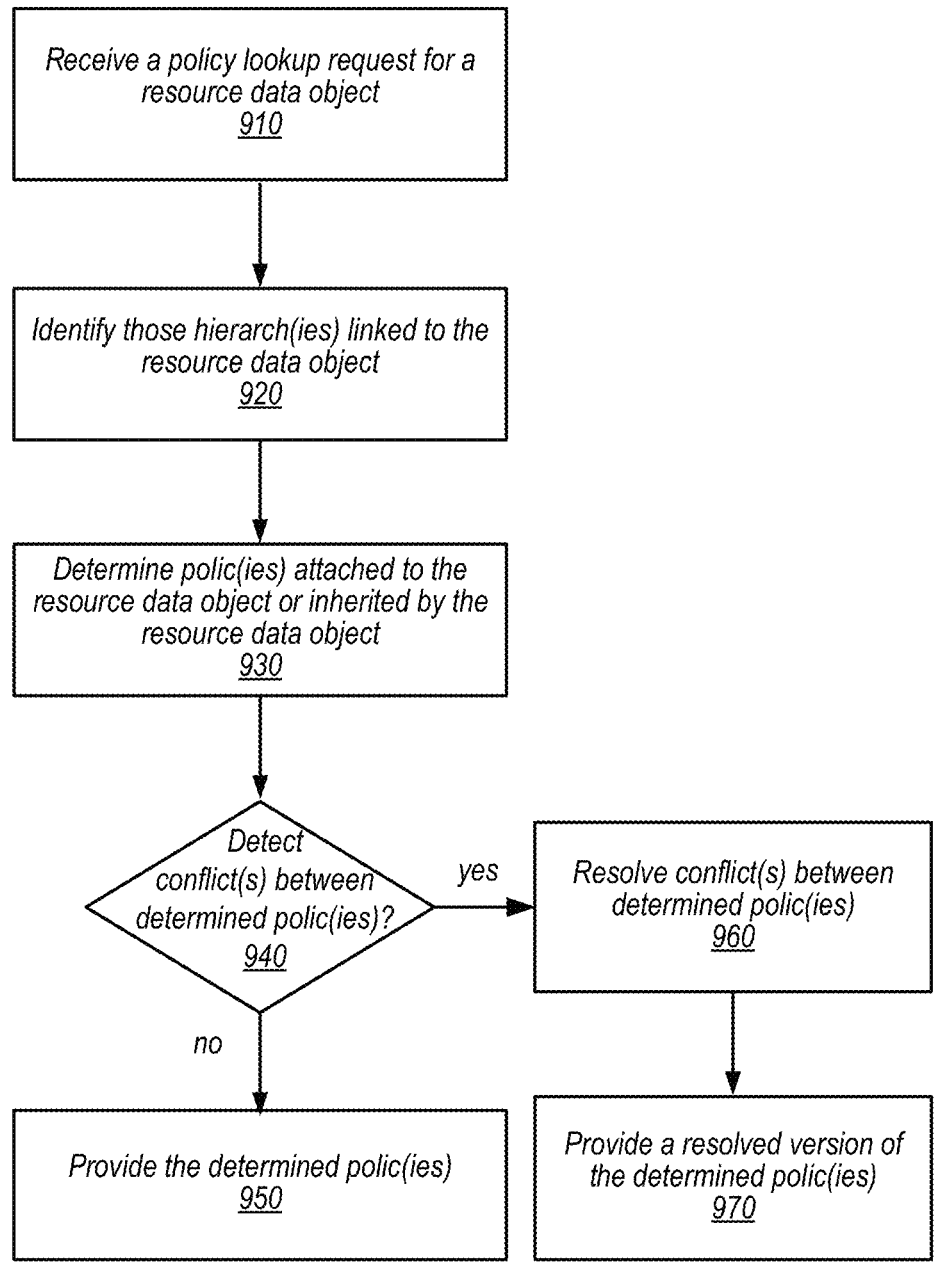
FIG. 9 is a high-level flowchart illustrating methods and techniques to handle a policy lookup request for a resource data object, according to some embodiments.

FIG. 9 is a high-level flowchart illustrating methods and techniques to handle a policy lookup request for a resource data object, according to some embodiments. As indicated at 910, a policy lookup request may be received for a resource data object. For example, the request may include an identifier that uniquely identifies the resource and thus the resource data object for which the lookup operation is being performed. As indicated at 920, those hierarch(ies) linked to the resource data object may be identified. For instance, in some scenarios, all hierarchies may be linked to the resource data object, whereas in other scenarios, only one or more hierarchies may include the specified resource data object. For those identified hierarchies, the polic(ies) attached to the resource data object or inherited by the resource data object may be determined, as indicated at 930. For example, the path(s) from the resource data object to the root node of each of the identified hierarchies may be traversed, and all attached policies in the path may be identified.

As indicated at 940, conflict(s) can occur between policies determined for a resource data object. Different hierarchies may apply different policies describing different access rights for the resource data object or different nodes in the path of the resource data object within a hierarchy may include the different policies describing different access rights, for example. If the policy types of any of the determined policies match for a resource data object, then a conflict may exist, as indicated by the positive exit from 940. Detected conflict(s) may be resolved between determined policies, as indicated at 960. For example, one of the conflicting policies (or confliction portions of the policies) may be elected over the other according to a precedence or inheritance model for policy applications (e.g., policies applied to child nodes in the hierarchy may supersede policies applied to parent nodes, or vice versa). In some embodiments, a knowledge base or other rules-based resolution technique may be implemented to evaluate the conflicting policies with respect to precedence or inheritance rules (including rules that modify conflicting policies) and may be configured to apply different inheritance or precedence rules for a policy type when the policy type is defined. Once the resolved version of the determined polic(ies) is determined, then as indicated at 970 the resolved version of the determined polic(ies) may be provided. If no conflict is detected, then the determined polic(ies) may be provided, as indicated at 950.

Figure 10:
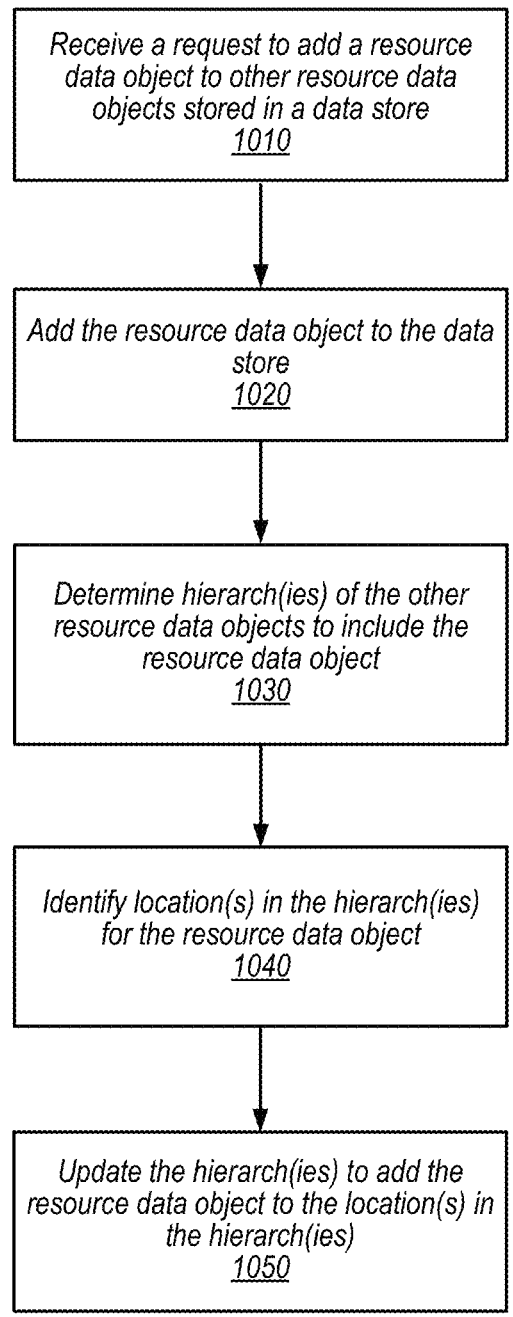
FIG. 10 is a high-level flowchart illustrating methods and techniques to handle a request to add a resource data object, according to some embodiments.

FIG. 10 is a high-level flowchart illustrating methods and techniques to handle a request to add a resource data object, according to some embodiments. As indicated at 1010, a request to add a resource data object to other resource data objects stored in the data store may be received, in various embodiments. The request may specify a unique identifier, and other information descriptive of a corresponding resource in a system that includes the resources corresponding to the other resource data objects. As indicated at 1020, the resource data object may be added to the data store. For example, as the model in FIG. 5 illustrates, the resource data object may be added to the resources directory in the appropriate resource type sub-directory.

As indicated at 1030, the hierarch(ies) of the other resource data objects may be determined to include the additional resource data object. For example, not all hierarchies may maintain all resource data objects. A membership policy for each hierarchy, for instance, may specify which resource data objects are maintained in the hierarchy, and which are not. Similarly, locations in the hierarch(ies) may be determined for the resource data object, as indicated at 1040. A default location (e.g., directly linked to the hierarchy root node) may be utilized or the membership policy may specify a location based on an evaluation of the resource data object. For instance, if the resource type of the resource data object is a computing resource, place the resource data object in group A, or if the resource data object is a user account, place the resource data object in group B. Once the location(s) are identified in the determined hierarch(ies), then the hierarch(ies) may be updated to add the resource data object to the location(s) in the hierarch(ies), as indicated at 1050.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 11:
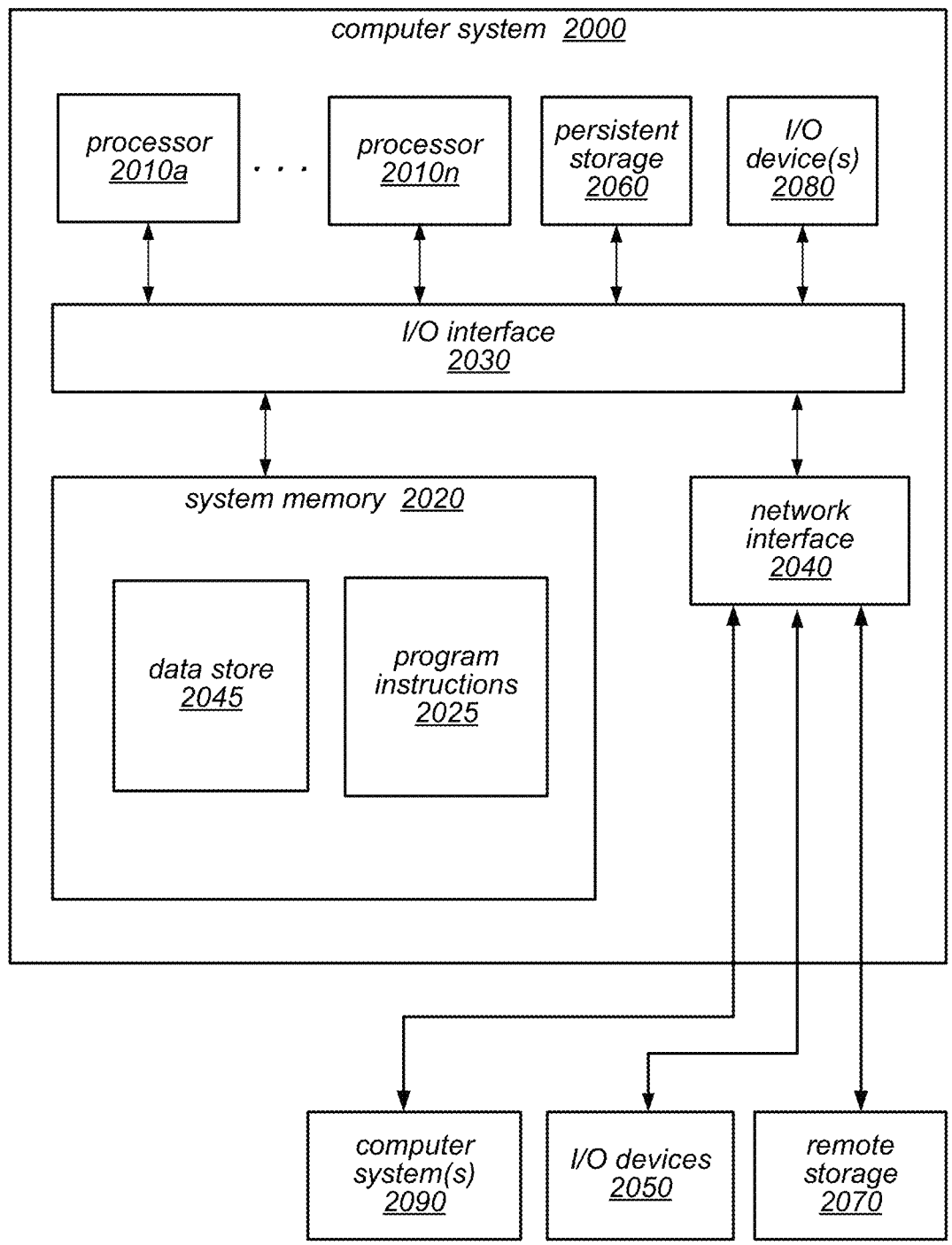
FIG. 11 is an example computer system, according to various embodiments.

FIG. 11 is a block diagram illustrating a computer system configured to implement different hierarchies of resource data objects for managing system resources, according to various embodiments, as well as various other systems, components, services or devices described above. For example, computer system 2000 may be configured to implement various components of a resource management service, hierarchical data store, or other provider network services, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a to uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the resource management or other systems implementing multiple hierarchies for managing system resources described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the hierarchy storage nodes or transaction log store described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement embodiments described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising
at least one processor; and
a memory, storing program instructions that when executed by the at least one processor cause the at least one processor to implement a hierarchical data store, the hierarchical data store configured to:
  receive a policy lookup request for a resource data object at the hierarchical data store, wherein the resource data object is one of a plurality of resource data objects that are stored in the hierarchical data store as part of a plurality of different hierarchies, wherein the plurality of different hierarchies of the resource data objects identify policies applicable to the behavior of resources corresponding to the resource data objects in a system;
  responsive to the policy lookup request:
    identify one or more of the different hierarchies linked to the resource data object;
    determine different policies identified by the one or more of the different hierarchies, wherein the different policies are applicable to the resource data object;
    detect a conflict between the different policies applicable to the resource data object; and
    return a resolved version of the different policies applicable to the resource data object.

2. The system of claim 1, wherein to detect the conflict between the different policies applicable to the resource data object, the hierarchical data store is configured to determine that respective policy types for the different policies match.

3. The system of claim 1, wherein to determine the different policies applicable to the resource data object, the hierarchical data store is configured to traverse respective paths of the identified hierarchies that include the resource data object to respective root nodes of the identified hierarchies.

4. The system of claim 1, wherein the resolved version of the different policies applicable to the resource data object is determined based, at least in part, on one or more precedence rules for resolving policy conflicts.

5. The system of claim 1, wherein the resolved version of the different policies applicable to the resource data object is determined based, at least in part, on respective nodes in paths of the resource data object in the identified hierarchies to which the different policies are applicable.

6. The system of claim 1, wherein the system that implements the resources is implemented as a network-based service offered by a provider network.

7. The system of claim 1, wherein the hierarchical data store is further configured to:
  receive a second policy lookup request for a second resource data object at the hierarchical data store;
  responsive to the second policy lookup request:
    identify one or more of the different hierarchies linked to the second resource data object;
    detect no conflict between different policies applicable to the second resource data object; and
    return the different policies applicable to the second resource data object.

8. A method, comprising:
receiving a policy lookup request for a resource data object at a data store, wherein the resource data object is one of a plurality of resource data objects that are stored in the data store as part of a plurality of different hierarchies, wherein the plurality of different hierarchies of the resource data objects identify policies applicable to the behavior of resources corresponding to the resource data objects in a system;

responsive to the policy lookup request:
    identifying one or more of the different hierarchies linked to the resource data object;
    determining different policies identified by the one or more of the different hierarchies, wherein the different policies are applicable to the resource data object;
    detecting a conflict between the different policies applicable to the resource data object; and
    returning a resolved version of the different policies applicable to the resource data object.

9. The method of claim 8, wherein detecting the conflict between the different policies applicable to the resource data object comprises determining that respective policy types of the different policies match.

10. The method of claim 8, wherein the different policies applicable to the resource data object are determined based on traversing respective paths of the identified hierarchies that include the resource data object to respective root nodes of the identified hierarchies.

11. The method of claim 8, wherein the resolved version of the different policies applicable to the resource data object is determined based, at least in part, on one or more precedence rules for resolving policy conflicts.

12. The method of claim 8, wherein the resolved version of the different policies applicable to the resource data object is determined based, at least in part, on respective nodes in paths of the resource data object in the identified hierarchies to which the different policies are applicable.

13. The method of claim 8, wherein the system that implements the resources is implemented as a network-based service offered by a provider network.

14. The method of claim 8, further comprising:
    receiving a second policy lookup request for a second resource data object at the hierarchical data store;
    responsive to the second policy lookup request:
        identifying one or more of the different hierarchies linked to the second resource data object;
        detecting no conflict between different policies applicable to the second resource data object; and
        returning the different policies applicable to the second resource data object.

15. One or more non-transitory, computer-readable storage media, storing program instructions that when executed on or across one or more computing devices cause the one or more computing devices to implement:
    receiving a policy lookup request for a resource data object at a data store, wherein the resource data object is one of a plurality of resource data objects that are stored in the data store as part of a plurality of different hierarchies, wherein the plurality of different hierarchies of the resource data objects identify policies applicable to the behavior of resources corresponding to the resource data objects in a system;
    responsive to the policy lookup request:
        identifying one or more of the different hierarchies linked to the resource data object;
        determining different policies identified by the one or more of the different hierarchies, wherein the different policies are applicable to the resource data object;
        detecting a conflict between the different policies applicable to the resource data object; and
        returning a resolved version of the different policies applicable to the resource data object.

16. The one or more non-transitory, computer-readable storage media of claim 15, wherein, in detecting the conflict between the different policies applicable to the resource data object, the program instructions cause the one or more computing devices to further implement determining that respective policy types of the different policies match.

17. The one or more non-transitory, computer-readable storage media of claim 15, wherein the different policies applicable to the resource data object are determined based on traversing respective paths of the identified hierarchies that include the resource data object to respective root nodes of the identified hierarchies.

18. The one or more non-transitory, computer-readable storage media of claim 15, wherein the resolved version of the different policies applicable to the resource data object is determined based, at least in part, on one or more precedence rules for resolving policy conflicts.

19. The one or more non-transitory, computer-readable storage media of claim 15, wherein the resolved version of the different policies applicable to the resource data object is determined based, at least in part, on respective nodes in paths of the resource data object in the identified hierarchies to which the different policies are applicable.

20. The one or more non-transitory, computer-readable storage media of claim 15, wherein the system that implements the resources is implemented as a network-based service offered by a provider network.

* * * * *